United States Patent [19]
Kogure et al.

[11] 4,145,134
[45] Mar. 20, 1979

[54] DEVICE FOR MOUNTING ELECTRONIC FLASH ON CAMERA

[75] Inventors: Yoshio Kogure; Shuji Ozawa, both of Tokyo, Japan

[73] Assignee: Sunpak Corporation, Tokyo, Japan

[21] Appl. No.: 853,187

[22] Filed: Nov. 21, 1977

[30] Foreign Application Priority Data

Aug. 18, 1977 [JP] Japan .......................... 52-109568[U]

[51] Int. Cl.² ...................... G03B 11/00; G03B 17/56
[52] U.S. Cl. ......................................... 354/295; 362/3
[58] Field of Search ................ 354/295, 126, 145, 32, 354/35, 75, 132, 288, 293, 354; 362/3, 9, 11, 84

[56] References Cited
U.S. PATENT DOCUMENTS

| | | | |
|---|---|---|---|
| 2,719,469 | 10/1955 | Sanford | 362/3 X |
| 3,559,549 | 2/1971 | Ackerman | 354/145 |
| 3,821,771 | 6/1974 | Johnson et al. | 354/293 |
| 3,852,790 | 12/1974 | Robinson | 354/145 |
| 3,961,349 | 6/1976 | Forsyth et al. | 354/295 |
| 4,025,933 | 5/1977 | Berg | 362/3 X |

Primary Examiner—L. T. Hix
Assistant Examiner—Thomas H. Tarcza
Attorney, Agent, or Firm—Robert I. Pearlman

[57] ABSTRACT

A device for mounting an electronic flash on a camera, which comprises a flat box accommodating film, a substantially pyramidal-shaped projection protruding from the flat box, a lens provided at the end of the projection and a flash receptacle. The device includes a portion for mounting the electronic flash, a portion surrounding and secured to the projection and a hinged portion for removably securing the device to the camera.

8 Claims, 5 Drawing Figures

DEVICE FOR MOUNTING ELECTRONIC FLASH ON CAMERA

BACKGROUND OF THE INVENTION

The present invention relates to a device for removably mounting an electronic flash on a special camera. To date, cameras of various types have been available. FIG. 1 shows an example of a suitable camera for use with the mounting device. It comprises a body 1 in the form of a flat box for accommodating film adjacent to the back, a projection 2 protruding from the front side of the body 1, and a lens 3 provided at the end face of the projection 2.

The projection 2 of the camera not only includes a rectangluar cross section but also has inward tapered sides which provide a pyramidal shape for the projection toward its free or front end. Of course, this pyramidal shape presents no problem in the functioning of the camera. For taking a picture in a dark place such as at night by using an artificial light source, a receptacle 4 for mounting an exclusive or dedicated flash is provided on the projection 2. The flash for the camera comprises a plurality of flash bulbs made integral with one another. Since its weight is very light, it can be sufficiently held in position by merely inserting its contact legs into the receptacle 4.

These flashes, however, are the consummable item although they are comparatively expensive, so that the use of an electronic flash which can be used substantially permanently has long been desired and is preferred to flash bulbs. However, unlike the standard flash bulb unit the electronic flash is relatively heavy since it includes a power source, a large capacitor and other components needed for operation of the flash, so that it cannot be stably held in position by merely inserting it into the receptacle 4.

BRIEF SUMMARY OF THE INVENTION

An object of the invention is to provide a mounting device, with which an electronic flash can be removably mounted on a camera and stably or securely held in the mounted state or position.

This invention relies on the fact that the aforementioned camera has a recess formed on one side of the projection for providing a shutter lever and another recess on another side for opening and closing a battery lid for accommodating a battery, and uses wall portions where both recesses are formed.

DETAILED DESCRIPTION OF THE PREFERRED EMBODIMENT

Figure 1:
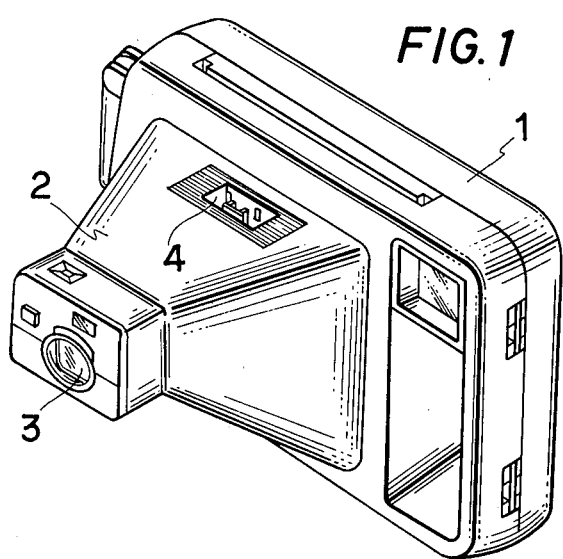
FIG. 1 is a perspective view of a camera for use with the mounting device according to the present invention.
Figure 2:
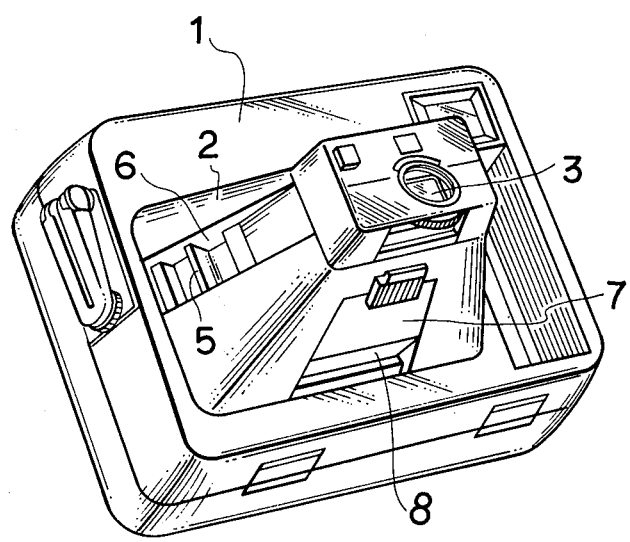
FIG. 2 is a perspective view of the camera of FIG. 1 viewed from the lower side.
Figure 3:
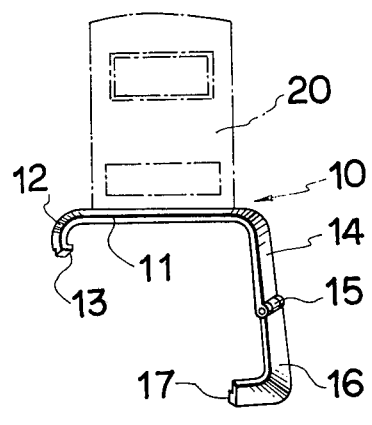
FIG. 3 is an elevational view of an embodiment of the invention including the mounting device and electronic flash.
Figure 4:
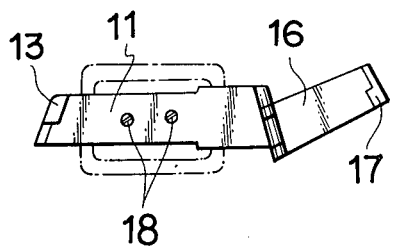
FIG. 4 is a bottom view of the embodiment of the invention shown in FIG. 3.

With reference to the drawings wherein like parts are designated by the same reference numeral throughout the several views, there is best shown in FIG. 3 generally designated at 10 a wrap-around mounting device according to the invention. It comprises an upper mounting portion 11 for mounting a plate-like electronic flash body 20 thereon, a short side portion 12 extending from one end of the mounting portion 11 substantially at right angles thereto and provided at the end with a hook portion 13, a longer side portion 14 extending from the other end of the mounting portion substantially at right angles thereto and provided at its end with a hinge 15, and a hook member or piece 16 rotatably or pivotably mounted on the hinge 15 and having a bent terminal end portion disposed substantially at right angles and provided at its end with a hook portion 17. The mounting portion 11 has substantially plate-like form for mounting the electronic flash body 20 as mentioned earlier. The electronic flash body is secured to the mounting portion by screws 18 which extend through laterally-spaced openings in mounting portion 11 into threaded engagement with threaded openings in the bottom of the flash.

Since the projection 2 has a pyramidal shape as mentioned earlier, the short side portion 12, longer side portion 14 and hook portion 16 are shaped such that the overall structure becomes narrower toward the front end of the projection (i.e. slopes or tapers inward from the camera body) so that it fits or corresponds to the shape of the tapered projection 2. The length of the short side portion 12 corresponds to the length from the top wall or side up to the upper wall portion of the recess 6 of the projection 2; the length of the longer side portion 14 and up to the bent end portion of the hinged hook portion 16 bent substantially at right angles coincides with the length of one side of the cylinder 2 (shown opposite the side including the recess); and the end portion of the hook piece 16 has a length which corresponds to the distance from the one side up to the nearest wall portion of the recess 8 located in the bottom side of projection 2. Both the hook portions 13 and 17 respectively extend inward from the short side portion 12 and the end of the hinged hook member 16 substantially at right angles so that they engage the walls of the recesses 6 and 8 formed in the projection 2.

Figure 5:
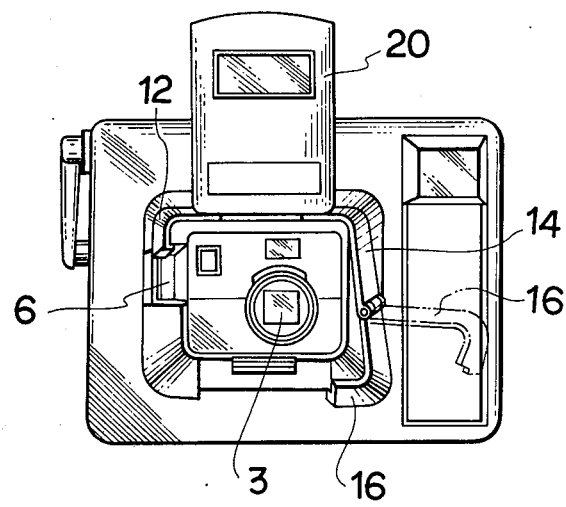
FIG. 5 is an elevational view showing an electronic flash mounted according to the invention on the camera of FIG. 1.

In the use of the above preferred embodiment, an assembly of the electronic flash body 20 secured to the mounting portion 11 by screws 18 is mounted on the camera. More particularly, to secure the assembly the hook piece 16 is rotated to an open or unlocked position as shown by the broken line in FIG. 5. Then, hook portion 13 of the short side portion 12 is brought into engagement with the wall of the recess 6, and then the contact legs or prongs of the electronic flash body 20 are inserted into the receptacle. Subsequently, the long side portion 14 is engaged with and adjacent the projection 2, and then the hinged hook piece 16 is rotated to bring the hook portion at its end into its locked or closed position in engagement with the wall portion of the recess 8. A relatively tight frictional fit is formed between the ends 13 and 17 and the recesses. The ends also can be made to snappingly engage the recess walls by providing a slight protuberance thereon.

Thus, the electronic flash body 20 can be stably mounted on the camera with the engagement of the hook portions 13 and 17 with the respective walls of the recesses 6 and 8. When removing it, the hook piece 16 is turned (away from projection 2) by disengaging the hook portion 17, whereby it can be simply removed. Although the end portion of the end piece 16 is shown to be bent substantially at right angles, it is desirably bent to an angle slightly smaller than the right angles so as to make use of the elasticity or resilience of the material for the mounting. While described as being metal, the wrap-around bracket 10 also may be made from a plastic material which will give it some degree of resilience and flexibility. In that case, the hinge can be integrally formed with the mounting bracket.

What is claimed is:

1. A device for mounting an electronic flash on a camera, comprising a mounting portion for mounting an electronic flash thereon, a short side portion extending from one end of the mounting portion substantially at right angles thereto and provided at its end with a first locking portion, a relatively longer side portion extending from the other end of the mounting portion substantially at right angles thereto and provided at its end with a hinged member having an end portion disposed at a substantially right angle with locking means adapted for releasably engaging a recess formed in the camera on which the device is mounted.

2. The device of claim 1 wherein said locking means comprises an inward disposed hook-shaped portion.

3. The device of claim 1 wherein said first locking portion comprises a hook-shaped portion.

4. The device of claim 1 wherein said mounting portion includes a plurality of spaced openings for enabling the flash to be mounted thereon.

5. The device of claim 1 wherein said mounting portion, said side portions and said hinged member all taper uniformly in a first direction.

6. The device of claim 1 in combination with a camera having a multi-sided projection including recesses in two of the sides thereof, said device wrapped about said projection such that said first locking portion releasably engages a first of said recesses and said locking means releasably engages a second of said recesses, said second recess being on a different side of said projection than said first recess.

7. The combination of claim 6 wherein said projection tapers inward in the direction away from said camera and said device has a corresponding taper in the same direction when mounted thereon.

8. The combination of claim 6 wherein said projection has a top side and a first adjacent side including said first recess and a bottom side including said second recess, said mounting portion being disposed on said top side.

* * * * *